United States Patent Office 3,606,170
Patented Sept. 20, 1971

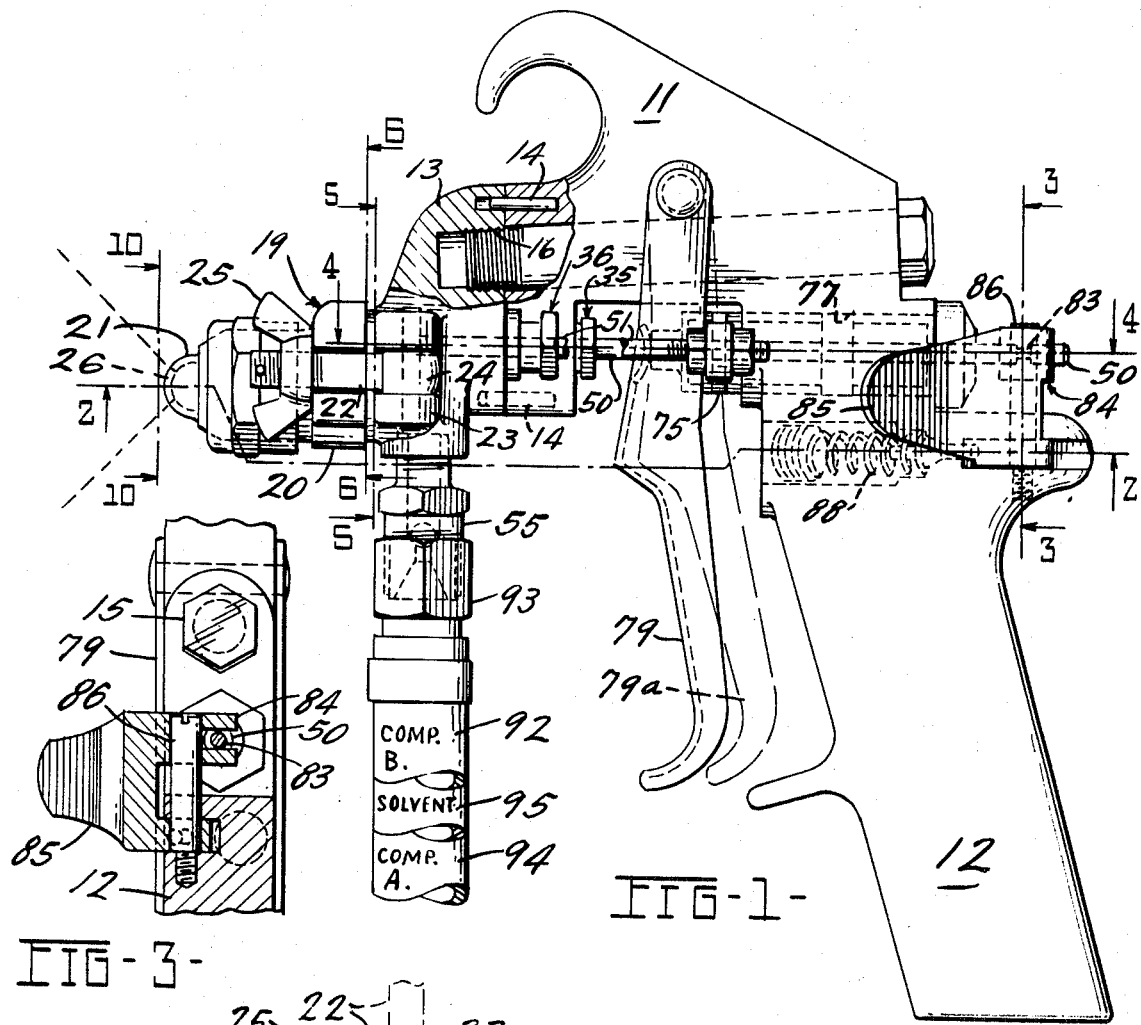
FIG-1-
FIG-3-
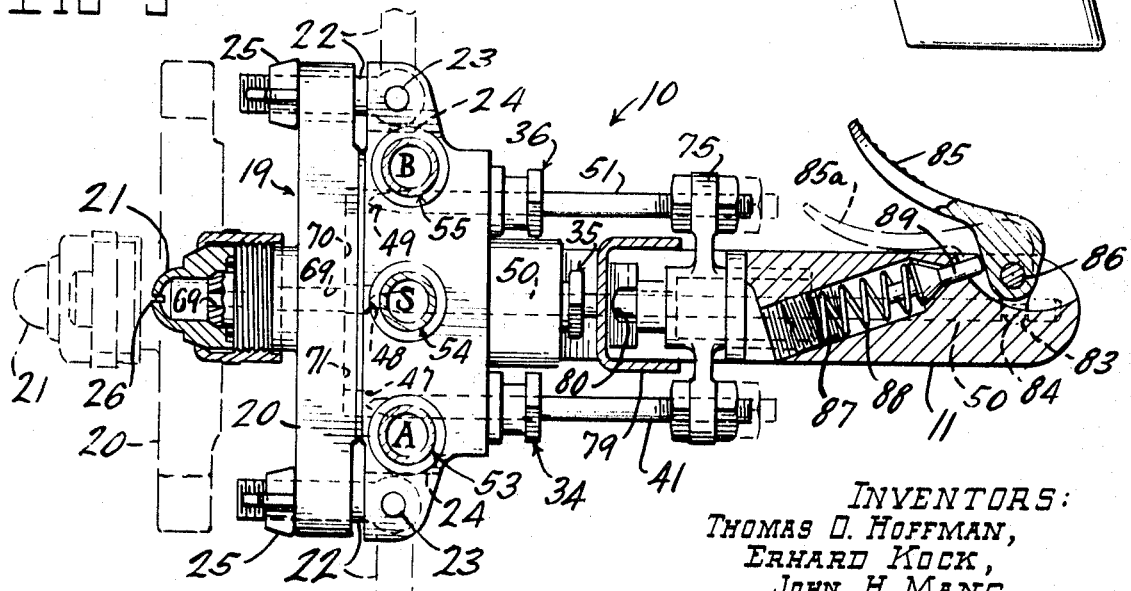
FIG-2-
INVENTORS:
THOMAS O. HOFFMAN,
ERHARD KOCK,
JOHN H. MANG,
EARL F. STAIFER.
BY Owen & Owen
ATT'YS.

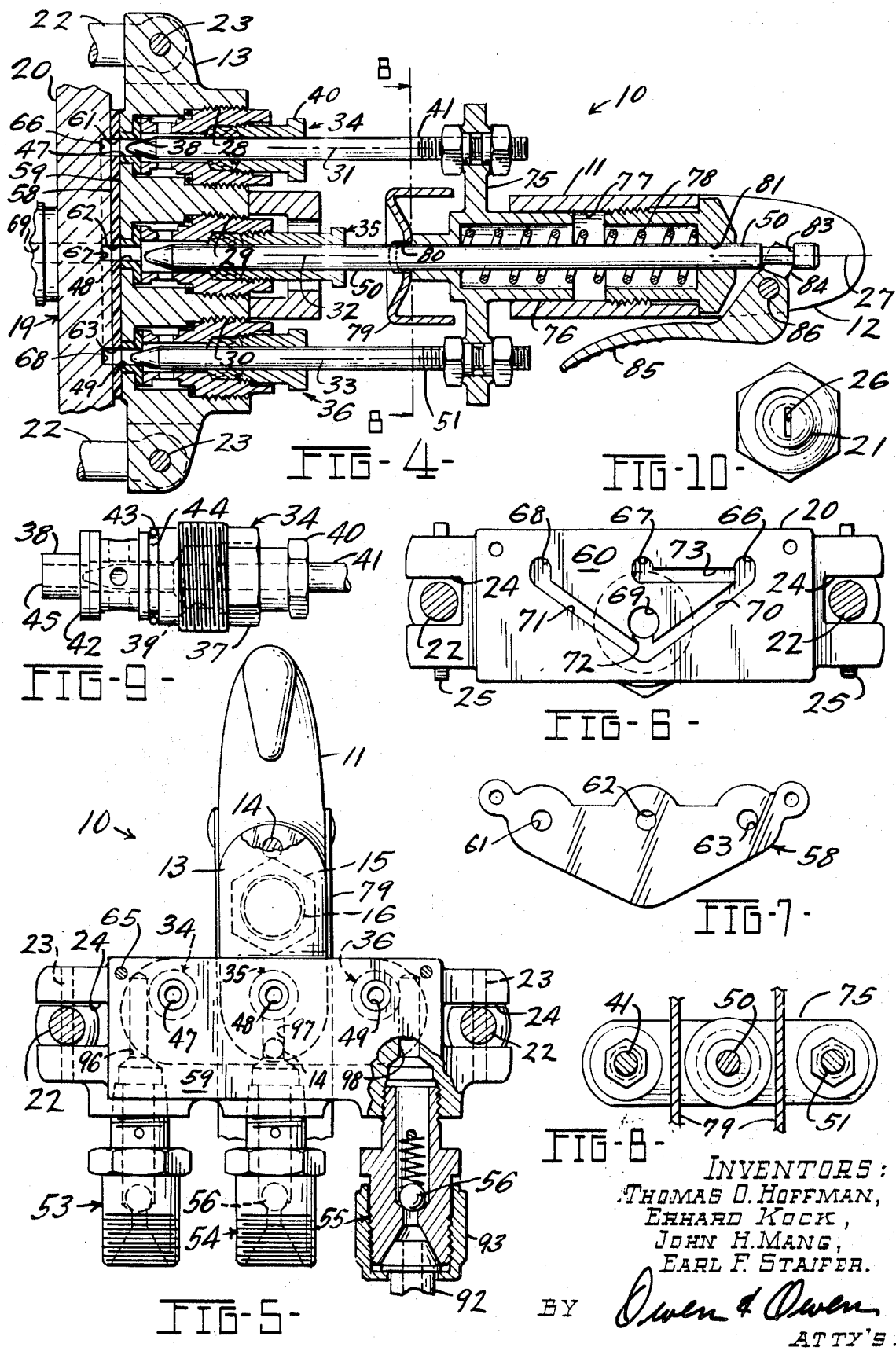

3,606,170
PLURAL COMPONENT SPRAY GUN
Thomas Oren Hoffman and Erhard Kock, Toledo, John H. Mang, Oregon, and Earl F. Staifer, Toledo, Ohio, assignors to Champion Spark Plug Company, Toledo, Ohio
Filed Feb. 9, 1970, Ser. No. 9,506
Int. Cl. B05b 7/12
U.S. Cl. 239—414   14 Claims

ABSTRACT OF THE DISCLOSURE

The present invention relates to a plural component spray gun which is utilized, for example, in the spraying of plastic foams. Pressurized fluid components flow through the spray gun where they are mixed together and discharged through a spray nozzle. The spray gun includes a spray head mounted on a spray gun body. The spray head defines a plurality of valve chambers which are located on longitudinally extending and parallel major axes. A valve assembly is positioned in each of the valve chambers and each of the valve assemblies includes a fluid discharge opening. A nozzle assembly, which includes a mixing plate is removably mounted on the front end of the spray head. The mixing plate is closely adjacent the discharge ends of the valve assemblies. The mixing plate defines a passageway network which is in communication with each of the fluid discharge openings. The plural components are fed through the passageway network upon the operation of a triggering apparatus. A second triggering apparatus is connected to another one of the valve assemblies and is utilized to direct solvent into the passageway network during the cleaning of the spray gun.

BACKGROUND OF THE INVENTION

This invention relates to an improved plural component spray gun. The widespread employment of sprayable plastics of various types has expanded the need for apparatus which is utilized in applying the plastic materials as coatings on articles and as, for example, expanded foam insulation material. The sprayable plastics, more particularly, sprayable polyurethane foams, are usually comprised of two or more chemically reactive components that must be maintained separate from one another until a time immediately prior to the discharge of the components from the spray gun.

In producing polyurethane foams, two separate liquid components are normally employed. One component is a blend of polyester or polyether polyol, a blowing agent, catalyst and surfactant. The other component is normally a refined or prepolymerized isocyanate. Variance in chemical formulation enables the resultant foam to have greatly different properties with respect to resiliency or rigidity and density. When the two components are homogeneously mixed, an exothermic reaction takes place, causing the blowing agent to expand as a gas, which is trapped within the tenacious mixture. When the reaction is completed the material becomes a cellular plastic foam. The entire reaction is normally completed in a matter of seconds. It is important that the reaction is not completed within the spray gun.

Non-cellular plastics such as polyester resins may be sprayed in a similar manner. In this case the base resin is divided equally, with one-half containing an accelerator and the other half containing a catalyst.

In the past, cleaning of plural component spray guns has often been difficult.

SUMMARY OF THE INVENTION

A plural component spray gun, according to the present invention, includes a longitudinally extending body preferably having a handle at one end. A spray head is mounted on the body. The spray head defines a plurality of longitudinally extending valve chambers which have major parallel axes. A removable valve assembly is positioned in each of the valve chambers and each of the valve assemblies includes a fluid discharge opening. A plurality of removable inlet assemblies depend from the body with each of the inlet assemblies being in fluid communication with a respective one of the valve assemblies.

A nozzle assembly is removably mounted on the spray head. The nozzle assembly includes a mixing plate which extends generally perpendicular to the major axes. The mixing plate defines a passageway network in communication with each of the fluid discharge openings and a discharge spray passageway. The passageway network is in communication with the spray passageway. A spray nozzle is mounted adjacent to and in communication with the spray passageway.

First triggering means are operatively connected to selective ones ones of the valve assemblies and second triggering means are operatively connected to another of the valve assemblies.

The primary object of the present invention is to provide an improved plural component spray gun.

BRIEF DESCRIPTION OF THE DRAWINGS

FIG. 1 is a side view with parts broken away of a plural component spray gun according to the present invention;

FIG. 2 is a horizontal sectional view taken along the line 2—2 of FIG. 1 and showing in dashed lines a nozzle assembly removed from the spray gun;

FIG. 3 is a fragmentary, vertical sectional view taken along the line 3—3 of FIG. 1 and showing in particular the second triggering means;

FIG. 4 is a fragmentary, horizontal sectional view taken along the line 4—4 of FIG. 1;

FIG. 5 is a vertical sectional view taken along the line 5—5 of FIG. 1 with a portion of one of the inlet assemblies broken away to expose its interior;

FIG. 6 is a sectional view taken along the line 6—6 of FIG. 1 and showing in particular a mixing plate according to the present invention;

FIG. 7 is a view similar to FIG. 6 showing a seal plate;

FIG. 8 is a vertical sectional view taken along the line 8—8 of FIG. 4;

FIG. 9 is a plan view showing one of the removable valve assemblies; and

FIG. 10 is a front view taken along the line 10—10 of FIG. 1.

DESCRIPTION OF THE PREFERRED EMBODIMENT

An improved plural component spray gun according to the present invention is generally indicated in the drawings by the reference number 10. The spray gun 10 includes a longitudinally extending spray gun body 11 having a handle 12 positioned at one end.

A spray head 13 is removably mounted on the other end of the body 11 by a plurality of indexing pins 14 and a bolt 15 which is received by a threaded portion 16 of the spray head 13. Preferably, the bolt 15 is hollow (not shown) and is utilized as a tool or part storage compartment.

A nozzle assembly 19, which includes a mixing plate 20 and a nozzle 21 is removably mounted on the spray head 13. Referring to FIG. 2, threaded arms 22 are pivotally connected to the spray head 13 by pivot pins 23. The mixing plate 20 includes a pair of end slots 24 (see FIG. 6), which receive the arms 22. Wing nuts 25 are threaded on the outer ends of the arms 22 to removably mount the nozzle assembly 19 to the spray head 13. It has been found that the ease in which the mixing plate 20 may be removed is unique. It is important in maintaining the gun 10 in an operational condition in the event of component "cross-over" or in the event of a failure to purge the gun 10. Preferably the nozzle 21 has a vertical discharge slot 26 (see FIG. 10).

Referring to FIG. 4, the spray gun 10 has a longitudinal centerline 27. In the present embodiment, the spray head 13 defines three valve chambers 28, 29 and 30. The valve chamber 28 has a longitudinal axis 31, the valve chamber 29 has a parallel longitudinal axis 32, and the valve chamber 30 has a parallel longitudinal axis 33. In the present embodiment, the axes 31, 32 and 33 in addition to being parallel to one another are also parallel to the longitudinal centerline 27 of the spray gun 10. Removable valve assemblies 34, 35 and 36 are positioned in the valve chambers 28, 29 and 30, respectively. Referring to FIGS. 4 and 9, the valve assembly 34 includes a removable body 37 which is threadably received in the valve chamber 28, a valve seat 38, a packing cavity 39, an adjustable packing nut 40 and a longitudinally movable valve needle 41. The valve seat 38 (FIGS. 4 and 9) is tubular in shape and has an end flange 42. The valve seat 38 is preferably nylon. By using seats 38 having differing internal diameters, the flow characteristics may be varied while using the needles 41 of the same size. An O-ring 43 is positioned in a circular groove 44. When the valve assembly 34 is removed from the valve chamber 28, the O-ring 43 is held in the groove 44 and is removed as a unit with the valve assembly 34. The valve seat 38 has a discharge end 45 which is the discharge end for the entire valve assembly 34. The valve assemblies 35 and 36 have similar constructions.

Referring to FIG. 5, the valve assembly 34 has a valve opening 47 which extends through the spray head 13. Similarly, the valve assembly 35 has a valve opening 48 and the valve assembly 36 has a valve opening 49. A valve needle 50 is received by the bore of the valve assembly 35 and a valve needle 51 is received by the bore of the valve assembly 36 (see FIG. 4).

Referring to FIG. 5, a plurality of removable inlet assemblies 53, 54 and 55 depend from the spray head 13 of the body 11 and are in fluid communication with the valve assemblies 34, 35 and 36, respectively. In the present embodiment, each of the inlet assemblies 53, 54 and 55 includes a ball type check valve 56 which ensures one-way flow of fluid into the gun 10.

The inlet assembly 53 is connected to a source of component, for example, isocyanate and the inlet assembly 55 is connected to a source of component, for example, an admixture of polyol, blowing agent, catalyst and surfactant. The inlet assembly 54 is connected to a source of solvent. In the present embodiment, the sources of supply are pressurized and the pressure urges the components and solvent through the gun 10 as opposed to the type of gun which uses atomizing air as the transporting vehicle.

A gasket plate or seal plate 58 (see FIGS. 4 and 7) is positioned between an outermost face 59 of the spray head 13 and the inner face 60 of the mixing plate 20. The seal plate 58 includes openings 61, 62 and 63. Indexing pins 65 (see FIG. 5) are located on the face 59 of the spray head 13 to ensure fast and accurate realignment of the seal plate 58 and the mixing plate 20.

Referring to FIG. 6, the mixing plate 20 includes cup-shaped recesses 66, 67 and 68 defined in the inner face 60. The mixing plate 20 also has a spray passageway 69 which is in communication with the spray nozzle 21.

Referring to FIG. 6, a channel 70 extends downwardly from the recess 66 and joins a converging channel 71 which extends downwardly from the recess 68. From the juncture of the channels 70 and 71, a reverse flow channel 72 extends upwardly to the spray passageway 69. A solvent channel 73 extends between the recesses 66 and 67. The channels 70, 71, 72 and 73 define a passageway network.

The valve needles 41 and 51 are adjustably connected to a common yoke 75 (see FIG. 4). A tubular portion 76 of the yoke 75 is slidably mounted in a bore 77 of the spray gun body 11 and is biased outwardly by a spring 78. The spring 78 urges the valve needles 41 and 51 into a closed or seating relationship with their respective valve seats. A trigger 79 is pivotally connected to the spray body 11. When the trigger 79 is squeezed, for example, to the position 79a shown in FIG. 1, the yoke 75 is moved rearwardly against the pressure of the spring 78 and the valve assemblies 34 and 36 are opened by moving the valve needles 41 and 51 away from their respective valve seats.

The trigger 79 has an opening 80 which receives the center valve needle 50. The valve needle 50 extends rearwardly through the spring 78 and through a coaxial opening 81 in the body 11. Referring to FIGS. 2 and 4, the valve needle 50 has a groove 83 which receives an engaging portion 84 of a solvent trigger 85. The solvent trigger 85 is pivotally mounted adjacent the rear end of the spray gun body 11 by a pivot pin 86.

A bore 87 is provided in the spray gun body 11 adjacent the solvent trigger 85. A spring 88 is positioned in the bore 87 and urges an engaging pin 89 outwardly against the solvent trigger 85. As shown in FIG. 2, the spring 88 urges the solvent trigger 85 in a clockwise direction. The engaging portion 84 of the trigger 85 transfers the spring force to the valve needle 50 thereby urging the valve needle 50 against its respective valve seat. When the operator moves the solvent trigger 85 to the position indicated in FIG. 2 by the reference number 85a, the valve needle 50 is moved from its seat and solvent passes through the valve chamber 29. An important advantage is that the component trigger 79 and the solvent trigger 85 can be operated simultaneously with the same hand.

In a typical operation of the plural component spray gun 10, a hose 92 having an adapter 93 is connected to the inlet assembly 55. The hose 92 is in communication with a source of component, designated component B in FIG. 1. Similarly, a hose 94 is connected to the inlet assembly 53 and leads to a source of component, designated component A. A hose 95 is connected to the inlet assembly 54 and is in communication with a solvent source. The operator aligns the spray gun 10 with the target and depresses the trigger 79 to the position 79a, as shown in FIG. 1. This moves the yoke 75 rearwardly thereby moving the valve needles 41 and 51 from their respective valve seats. Components A and B flow through the respective valve chambers 28 and 30. Component B is discharged through the valve opening 49; through the opening 63 in the heal plate 58; into the recess 68 in the mixing plate 20; and downwardly along the channel 71. Similarly, component A flows from the valve chamber 28, through the valve opening 47, through the opening 61 in the seal plate 58, into the recess 66 in the mixing plate 20, and downwardly along the channel 70. Components A and B join at the intersection of the channels 70 and 71 where they move upwardly through the reverse flow channel 72 and are directed out of the spray passageway 69. Referring to FIG. 2, the spray passageway 69 is in communication with the discharge nozzle 21. It has been found that the reverse flow channel 72 which leads to the spray passageway 69 provides excellent impingement mixing of components A and B.

If one of the sources of supply of components A or B becomes exhausted or inoperable, the check valves within the inlet assemblies 53 and 55, for example, the check valve 56, prevent flow of the second component in a reverse direction which would contaminate the first component source.

When the operator desires to clean the gun 10, he depresses the solvent trigger 85. The engaging portion 84 of the trigger 85 forces the valve needle 50 rearwardly from its valve seat. Solvent is directed through the inlet assembly 54, through the valve chamber 29, through the valve opening 48, the opening 62 in the seal plate 58, into the recess 67 in the mixing plate 20 and into the solvent channel 73. The solvent enters the entire passageway network; the spray passageway 69; and through the nozzle 21. The solvent flow is stopped at the ends of valves 34 and 36, thus cleaning the face at the source of the components. The cleaning feature of the present apparatus is an important feature.

If, as sometimes happens, the operator is careless and does not promptly clean the gun as described above, the present apparatus may be placed back into operation very quickly. When this occurs, the nozzle assembly 19 may be quickly removed and replaced with spare parts. By this method, the gun 10 may be placed back in service quickly and the clogged parts cleaned later. In the alternative, the nozzle assembly 19 may be cleaned upon removal and immediately replaced on the gun 10. An important feature of the invention is the removable nozzle assembly 19. As previously mentioned, the wing nuts 25 may be loosened and the nozzle assembly 19 quickly removed. This provides access to the mixing plate 20, the seal plate 58 and the valve openings 47, 48 and 49.

Another important feature of the invention is that the discharge ends 45 of the valve assemblies 34, 35 and 36 are closely adjacent the face 59 of the spray head 13 and that the mixing plate 20 is contiguous to the face 59. This construction tends to reduce the clogging problems found in many prior art devices.

It has been found the gun 10 is an efficient tool which because of its ready cleaning features is suitable for high production uses.

What we claim is:

1. A plural component spray gun comprising, in combination, a longitudinally extending body, a spray head mounted on said body, said spray head defining a plurality of longitudinally extending valve chambers, a valve assembly positioned in each of said valve chambers, each of said valve assemblies including a fluid discharge opening, a plurality of inlet assemblies depending from said body, each of said inlet assemblies being in fluid communication with a respective one of said valve assemblies, a nozzle assembly removably mounted on said spray head, said nozzle assembly including a mixing plate defining a spray passageway and a passageway network in communication with each of said fluid discharge openings, said passageway network being in fluid communication with said spray passageway, a spray nozzle mounted on said mixing plate adjacent and in communication with said spray passageway and triggering means operatively connected to said valve assemblies.

2. A plural component spray gun, according to claim 1, wherein said longitudinally extending valve chambers have parallel major axes and wherein said mixing plate extends generally in a plane perpendicular to said major axes.

3. A plural component spray gun, according to claim 2, wherein said spray head includes means adjacent said nozzle assembly for removably attaching said nozzle assembly to said spray head.

4. A plural component spray gun, according to claim 3, wherein said nozzle assembly attaching means comprises a pair of arms pivotally attached to said spray head, said nozzle assembly defining a pair of slots, such slots being suitable for receiving said arms.

5. A plural component spray gun, according to claim 3, wherein said triggering means includes a first trigger operatively connected to selected ones of said valve assemblies and a second trigger operatively connected to another one of said valve assemblies.

6. A plural component spray gun, according to claim 5, including first and second spring means for biasing said first and second triggers.

7. A plural component spray gun, according to claim 3, wherein such passageway network includes a reverse flow passageway adjacent said spray passageway, whereby such reverse flow passageway aids the mixing of the components which enter such passageway.

8. A plural component spray gun, according to claim 6, wherein each of said inlet assemblies includes a check valve.

9. A plural component spray gun, according to claim 8, including a seal plate positioned between said spray head and said mixing plate.

10. A plural component spray gun, according to claim 7, wherein such passageway network includes converging channels in communication with respective ones of said valve assemblies and a solvent channel in communication with said converging channels.

11. A plural component spray gun, according to claim 1, wherein said fluid discharge openings of said valve assemblies are closely adjacent said mixing plate.

12. A plural component spray gun, according to claim 1, wherein each of said valve assemblies includes a nylon valve seat and a longitudinally extending valve needle, said nylon valve seat defining a longitudinally extending passageway of a predetermined internal diameter which receives a cooperating portion of said valve needle.

13. A plural component spray gun, according to claim 1, wherein said spray nozzle defines a longitudinally extending discharge slot located in a predetermined position.

14. A plural component spray gun, according to claim 13, wherein such discharge slot is elongated in a predetermined vertical position.

References Cited

UNITED STATES PATENTS

| 2,969,926 | 1/1961 | Peeps | 239—583X |
| 2,971,700 | 2/1961 | Peeps | 239—414X |
| 3,116,020 | 12/1963 | Rosen et al. | 239—569X |
| 3,229,911 | 1/1966 | Carlson et al. | 239—428X |
| 3,366,337 | 1/1968 | Brooks et al. | 239—416.1X |

M. HENSON WOOD, JR., Primary Examiner

E. D. GRANT, Assistant Examiner

U.S. Cl. X.R.

239—417.5, 428